(12) United States Patent
Koike et al.

(10) Patent No.: US 10,890,517 B2
(45) Date of Patent: Jan. 12, 2021

(54) PARTICULATE MATTER DETECTION DEVICE

(71) Applicant: DENSO CORPORATION, Kariya (JP)

(72) Inventors: Kazuhiko Koike, Nisshin (JP); Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 16/086,391

(22) PCT Filed: Feb. 9, 2017

(86) PCT No.: PCT/JP2017/004782
§ 371 (c)(1),
(2) Date: Sep. 19, 2018

(87) PCT Pub. No.: WO2017/163650
PCT Pub. Date: Sep. 28, 2017

(65) Prior Publication Data
US 2019/0107475 A1 Apr. 11, 2019

(30) Foreign Application Priority Data

Mar. 22, 2016 (JP) ................................. 2016-057410
Jul. 15, 2016 (JP) ................................. 2016-140655

(51) Int. Cl.
*G01N 15/06* (2006.01)
*G01N 15/00* (2006.01)

(52) U.S. Cl.
CPC ..... *G01N 15/0606* (2013.01); *G01N 15/0656* (2013.01); *G01N 2015/0046* (2013.01)

(58) Field of Classification Search
CPC .................. G01N 15/0606; G01N 15/0656
USPC .......................................... 73/23.31
See application file for complete search history.

(56) References Cited

U.S. PATENT DOCUMENTS

2017/0307501 A1* 10/2017 Shimokawa ......... G01N 1/2252

FOREIGN PATENT DOCUMENTS

JP 2012-052811 3/2012
WO 2016/052734 4/2016

* cited by examiner

*Primary Examiner* — Tarun Sinha
(74) *Attorney, Agent, or Firm* — Nixon & Vanderhye P.C.

(57) ABSTRACT

A particulate matter detection device includes a sensor unit which has a detection unit provided with a pair of electrodes and a heater unit provided with a heater electrode and which is configured to output a signal corresponding to the amount of particulate matter, and a sensor control unit which detects the number of particles of the particulate matter. The sensor control unit has a capture control unit, a heating control unit to heat the detection unit to a first temperature at which a SOF is volatilizable and a second temperature at which soot is burnable, an output changing ratio calculation unit to calculate a ratio between a first output value at the first temperature and a second output value as the maximum output upon heating to the second temperature, and a particle number calculation unit to estimate the average particle diameter of the particulate matter from a value corrected based on the temperature of the sensor unit at the second output value to calculate the number of particles.

20 Claims, 12 Drawing Sheets

(BEFORE CORRECTION)

(AFTER CORRECTION)

(AFTER CONTROL)

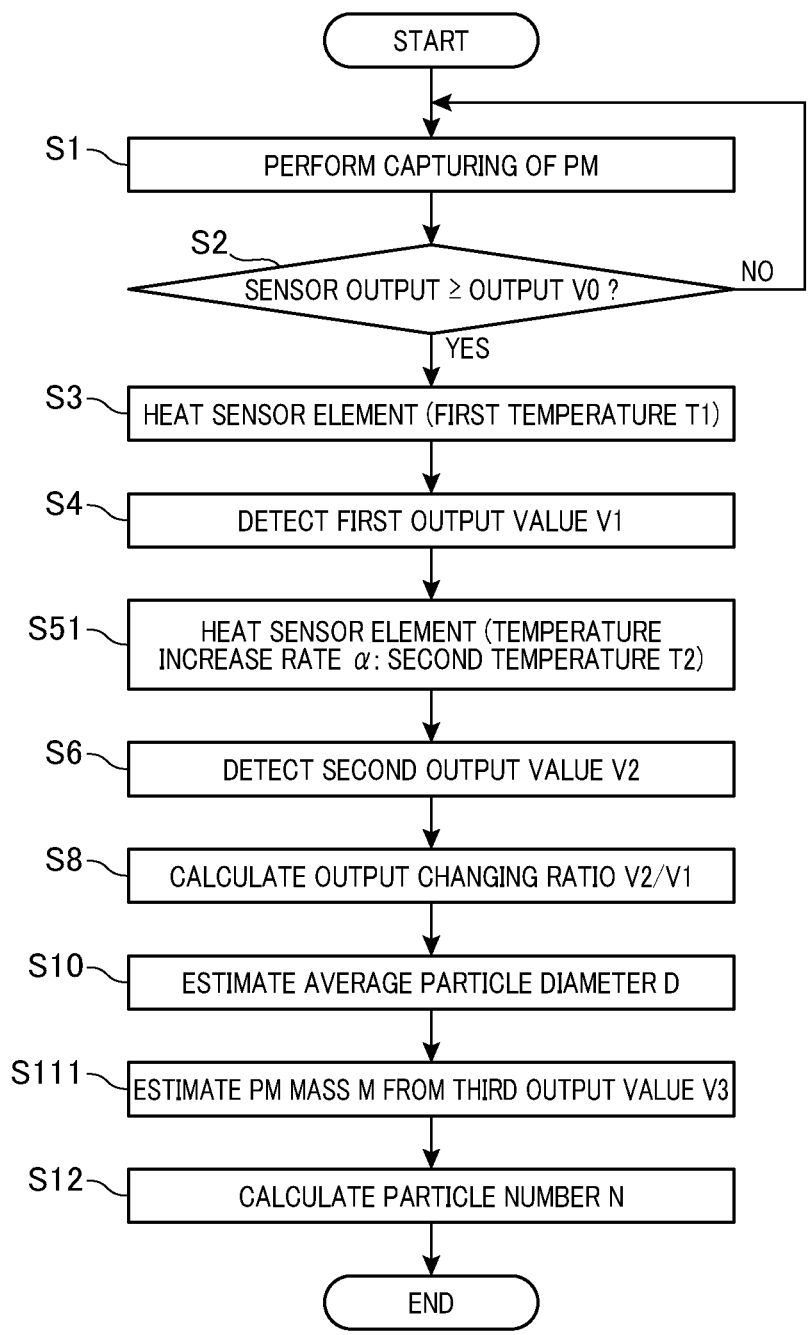

PARTICULATE MATTER DETECTION DEVICE

This application is a U.S. National Phase Application under 35 U.S.C. 371 of International Application No. PCT/JP2017/004782 filed on Feb. 9, 2017 and published in Japanese as WO 2017/163650 on Sep. 28, 2017. This application is based on and claims the benefit of priority from Japanese Patent Application No. 2016-57410 filed on Mar. 22, 2016 and Japanese Patent Application No. 2016-140655 filed on Jul. 15, 2016. The entire disclosures of all of the above applications are incorporated herein by reference.

TECHNICAL FIELD

The present disclosure relates to a particulate matter detection device for detecting the number of particles of a particulate matter discharged from an internal combustion engine.

BACKGROUND ART

In response to emission constraint on a particulate substance (i.e., a particulate matter hereinafter referred to as "PM" as necessary) contained in automobile exhaust gas, it is important to enhance detection accuracy of a particulate matter detection device. The particulate matter detection device includes, for example, an electrically resistance sensor element. The particulate matter detection device is configured to form an electrostatic field by application of voltage to a detection electrode portion provided on a surface of an insulating base, thereby detecting a change in the resistance value of the detection electrode portion due to the particulate matter which is captured.

The particulate matter detection device is capable of estimating the amount of discharged particulate matter from the output of the sensor element. Moreover, it has been considered that the number of particles of the discharged particulate matter is restricted. For example, Patent Literature 1 discloses a sensor control device has a plurality of electrically resistant PM detectors arranged so that a voltage applied to each PM detector is adjusted to detect the distribution of a PM particles that according to diameter size. This device detects a PM mass from the sensor output of each PM detection unit, and calculates the number of particles from the PM mass and an average particle mass set for each PM detection unit.

CITATION LIST

Patent Literature

[PTL 1] JP 2010-52811 A

SUMMARY

The particulate matter discharged together with the exhaust gas is a mixture containing conductive soot (i.e., soot) as a main component, and a particle shape or a chemical composition greatly changes according to engine operation conditions. For example, the particulate matter contains a soluble organic fraction (i.e., SOF) derived from unburnt fuel or engine oil, and a SOF amount changes according to an engine combustion state. Thus, the conductivity of the discharged particulate matter fluctuates according to the SOF amount, and also changes according to an exhaust gas temperature around the sensor element. For this reason, there is variation in the sensor output. It was discovered that issues of such variation in the sensor output also occur when the multiple PM detection units are formed in the sensor element, as in the device of Patent Literature 1, and this lowers detection accuracy.

An object of the present disclosure is to provide a particulate matter detection device configured so that variation in a sensor output due to the amount of SOF contained in a particulate matter or a surrounding temperature can be reduced and the accuracy of detecting the number of particles of particulate matter can be improved.

One aspect of the present disclosure is a particulate matter detection device for detecting particulate matter contained in measuring gas.

The particulate matter detection device includes a sensor unit which has a detection unit. The detection unit has a pair of electrodes separated from each other, the pair of electrodes being arranged on a surface of an insulating base and exposed to the measuring gas and a heater unit provided with a heater electrode configured to heat the detection unit which is configured to output a signal corresponding to the amount of particulate matter captured on the detection unit. The sensor unit is also provided with a sensor control unit configured to detect the number of particles of the captured particulate matter based on a sensor output from the sensor unit.

The sensor control unit has a capture control unit to control electrostatic capturing of the particulate matter by applying a voltage between the pair of electrodes of the detection unit, a heating control unit supplying power to the heater electrode of the heater unit heat the detection unit to a first temperature at which SOF in the particulate matter is volatilizable and soot is not burnable and maintain the detection unit at the first temperature or heat the detection unit to a second temperature at which the soot is burnable and maintain the detection unit at the second temperature, an output change ratio calculation unit acquiring a first output value as a sensor output at the first temperature and a second output value as the maximum sensor output upon heating from the first temperature to the second temperature, thereby calculating an output changing ratio as the ratio of the second output value to the first output value, and a particle number calculation unit calculating the number of particles by means of the average particle diameter of the particulate matter estimated from the calculated output changing ratio and the mass of the particulate matter estimated from the sensor output.

The particle number calculation unit has a temperature correction section configured to correct the calculated output changing ratio based on the temperature of the sensor unit at the second output value.

Another aspect of the present disclosure is the particulate matter detection device for detecting particulate matter contained in measuring gas. The particulate matter detection device includes the sensor control unit to detect the number of particles of the captured particulate matter based on the sensor output from the sensor unit. The sensor control unit has the capture control unit which applies a voltage between the pair of electrodes of the detection unit to electrostatically capture the particulate matter, the heating control unit supplying power to the heater electrode of the heater unit to heat the detection unit to the first temperature at which SOF in the particulate matter is volatilizable and soot is not burnable and maintain the detection unit at the first temperature or to heat the detection unit to the second temperature at which the soot is burnable and maintain the detection unit at the second temperature, the output changing ratio calculation unit acquiring the first output value as a sensor output at the first temperature and a second output value as the maximum sensor output upon heating from the first temperature to the second temperature, thereby calculating the output changing ratio as the ratio of the second output value to the first output value, and the particle number calculation unit calculating the number of particles by means of the average particle diameter of the particulate matter estimated from the calculated output changing ratio and the mass of the particulate matter estimated from the sensor output.

The heating control unit has a temperature increase control section configured to control a temperature increase rate upon heating from the first temperature to the second temperature.

EFFECT OF THE INVENTION

In the above-described particulate matter detection device, the sensor control unit actuates the capture control unit to start electrostatic capturing of the particulate matter. Meanwhile, the heating control unit is actuated to heat the detection unit to the first temperature, thereby acquiring the first output value corresponding to the particulate matter from which the SOF has been volatilized. Further, the heating control unit is actuated to heat the detection unit to the second temperature, thereby acquiring the second output value corresponding to the particulate matter right before the soot is burnt. The output changing ratio as the ratio between the first output value and the second output value correlates with the average particle diameter of the captured particulate matter, and therefore, the average particle diameter can be estimated from the output changing ratio.

The output changing ratio calculated by the output changing ratio calculation unit exhibits temperature dependency. Thus, as in one aspect as described above, the temperature correction section is provided at the particle number calculation unit to perform correction by means of the temperature of the sensor unit, and therefore, the average particle diameter can be estimated with high accuracy. Alternatively, as in another aspect as described above, the temperature increase control section is provided at the heating control unit to control the rate of temperature increase from the first temperature to the second temperature, and therefore, temperature influence can be reduced. In this case, variation in the output changing ratio can be also reduced, and the average particle diameter can be also estimated with high accuracy. The number of particles can be calculated using the average particle diameter and the mass of the particulate matter estimated from the sensor output.

Thus, according to the above-described aspects, influence of the SOF contained in the particulate matter is eliminated, and variation in the output due to a surrounding temperature is corrected. This can improve the accuracy for detecting the number of particles of the captured particulate matter.

BRIEF DESCRIPTION OF THE DRAWINGS

The above-described object of the present disclosure and other objects, features, and advantageous effects of the present disclosure are more apparent from detailed description below with reference to the attached drawings. The drawings are:

FIG. 18 is a flowchart showing a particulate matter detection process executed by a sensor control unit of a particulate matter detection device in a fourth embodiment.

DESCRIPTION OF EMBODIMENTS

First Embodiment

Figure 1:
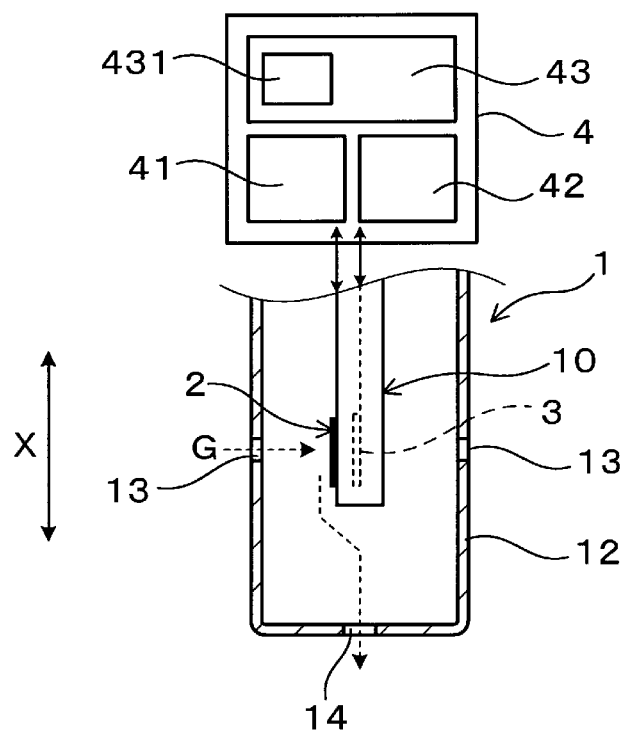
FIG. 1 is an enlarged view of a main part of one example of a particulate matter detection sensor forming a particulate matter detection device in a first embodiment.
Figure 2:
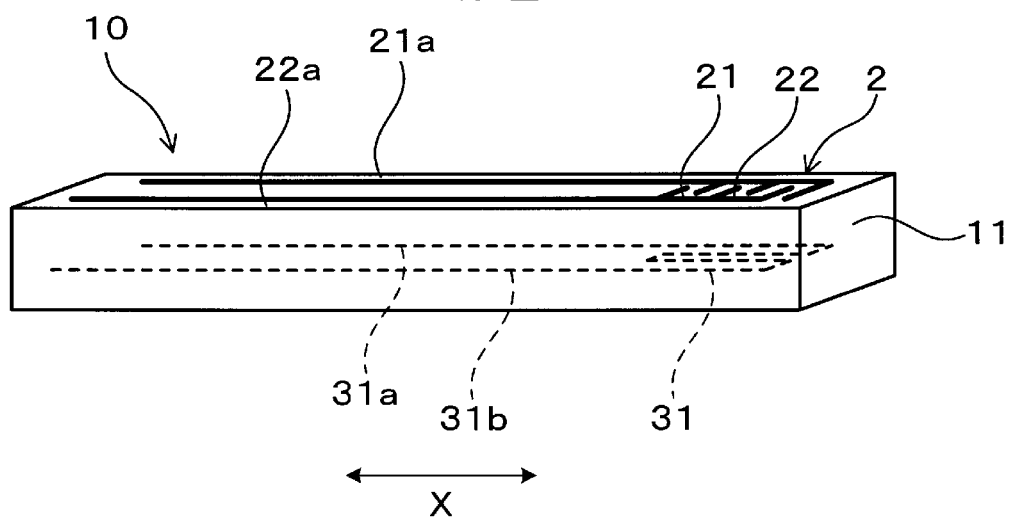
FIG. 2 is a perspective view showing an overall configuration example of a sensor element of the particulate matter detection sensor in the first embodiment.
Figure 3:
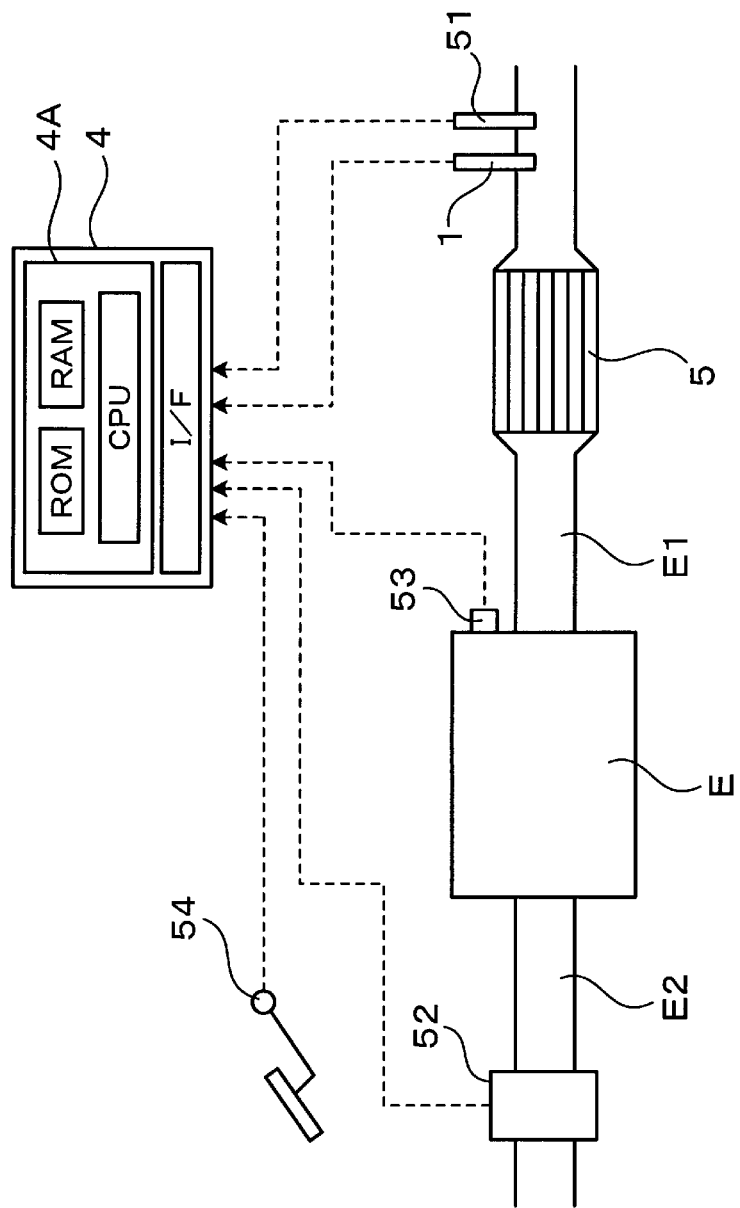
FIG. 3 is a schematic configuration diagram showing a total configuration of an exhaust gas purification device of an internal combustion including the particulate matter detection device in the first embodiment.

Next, an embodiment of a particulate matter detection device and a particulate matter detection method will be described with reference to the drawings. As illustrated in FIGS. 1 to 3, the particulate matter detection device includes a particulate matter detection sensor 1 as a sensor unit configured to detect a particulate matter contained in measuring gas G, and an electronic control unit 4 (hereinafter referred to as an "ECU") as a sensor control unit configured to detect the number of particles of the particulate matter based on a detection signal from the particulate matter detection sensor 1. The ECU 4 outputs a control signal to the particulate matter detection sensor 1, thereby controlling collection and detection of the particulate matter.

As illustrated in FIG. 1, the particulate matter detection sensor 1 includes an electrical resistance sensor element 10 and a protection cover 12 configured to cover the outer periphery of the sensor element 10. When an axial direction of the protection cover 12 is taken as a longitudinal direction X (i.e., an upper to lower direction of FIG. 1), the sensor element 10 includes, on a tip end side surface thereof (i.e., a lower end side in FIG. 1), a detection unit 2 exposed to the measuring gas G. The detection unit 2 can be heated by a heater unit 3 built in the sensor element 10. The protection cover 12 is made of a metal material such as stainless steel in a tubular shape, and at side surfaces and a tip end surface thereof, has multiple measuring gas circulation holes 13 and 14. For example, as illustrated in the figures, the measuring gas is introduced into the protection cover 12 through the measuring gas circulation hole 13 formed at the side surface facing the detection unit 2, and then, the flow of measuring gas G toward the measuring gas circulation hole 14 formed at the tip end surface along a surface of the detection unit 2 is formed.

The measuring gas G is, for example, combustion exhaust gas discharged from an internal combustion engine E illustrated in FIG. 3, and the particulate matter (i.e., PM) is a mixture containing soot (i.e., soot) as a conductive component and a soluble organic fraction (i.e., SOF) as an organic component. The amount of discharged particulate matter and a particle state of the particulate matter, such as a particle size or a chemical composition, change according to an operation state of the internal combustion engine E. The internal combustion engine E is, for example, a diesel engine, and a diesel particulate filter (hereinafter referred to as a "DPF") 5 as a particulate matter collection unit is arranged in an exhaust gas path E1 in which the exhaust gas circulates. The particulate matter detection sensor 1 is arranged downstream of the DPF 5, and is attached and fixed to the exhaust gas path E1 such that a half portion of the particulate matter detection sensor 1 on a tip end side is positioned in the exhaust gas path E1. The particulate matter detection sensor 1 is connected to the ECU 4, thereby outputting, to the ECU 4, the detection signal corresponding to the amount of PM in the exhaust gas on the downstream side of the DPF 5.

As illustrated in FIG. 2, the sensor element 10 has a rectangular parallelepiped insulating base 11, the detection unit 2 formed on a tip end side surface (i.e., on a right end side in a right to left direction in FIG. 2) of the insulating base 11 in the longitudinal direction X, and the heater unit 3 embedded in the insulating base 11. The detection unit 2 includes a pair of electrodes 21 and 22 printed and formed in a comb-tooth shape on one side surface (i.e., an upper surface in FIG. 2, a left surface in FIG. 1) of the insulating base 11. Each of the comb-tooth shaped electrodes 21 and 22 include multiple wire electrodes, and the wire electrodes with different polarities are alternately arranged in parallel to form multiple electrode pairs. The electrodes 21 and 22 are each connected to linear lead electrodes 21a and 22a extending from a tip end side to a base end side (i.e., a left end side in FIG. 2) of the insulating base 11.

The heater unit 3 includes a heater electrode 31 arranged on the tip end side of the insulating base 11, and lead electrodes 31a and 31b connected to the heater electrode 31 and extending toward a base end side. The insulating base 11 includes, for example, a stack of multiple insulating sheets made of an insulating ceramic materials such as alumina. The heater electrode 31 and the lead electrodes 31a and 31b are printed and formed on a surface of the insulating sheet, and other insulating sheets are stacked on the resultant insulating sheet to form a predetermined rectangular parallelepiped compact. Then, the compact is sintered. In this manner, the sensor element 10 including the built-in heater unit 3 can be formed.

The electrodes 21 and 22 and the lead electrodes 21a and 22a of the detection unit 2 and the heater electrode 31 and the lead electrodes 31a and 31b of the heater unit 3 are, for example, made of a conductive material such as noble metal, and can be formed in predetermined electrode shapes by means of, e.g., screen printing. Note that the heater unit 3 is not necessarily embedded in the insulating base 11, and may be printed and formed on a surface of the insulating base 11 such as a side surface different from one side surface on which the detection unit 2 is formed. As long as the heater unit 3 is capable of heating the detection unit 2, the heater unit 3 may be provided separately from the insulating base 11, for example.

Figure 4:
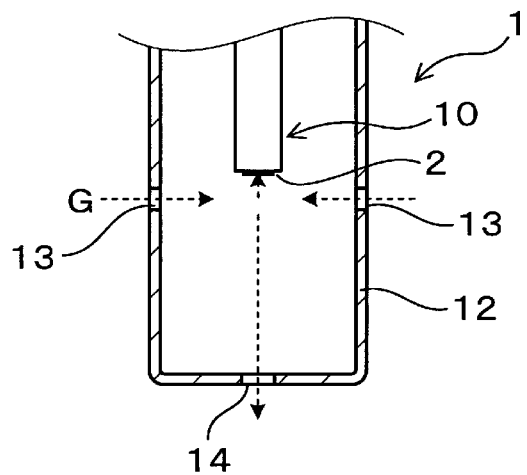
FIG. 4 is an enlarged view of a main portion showing another example of the particulate matter detection sensor in the first embodiment.
Figure 5:
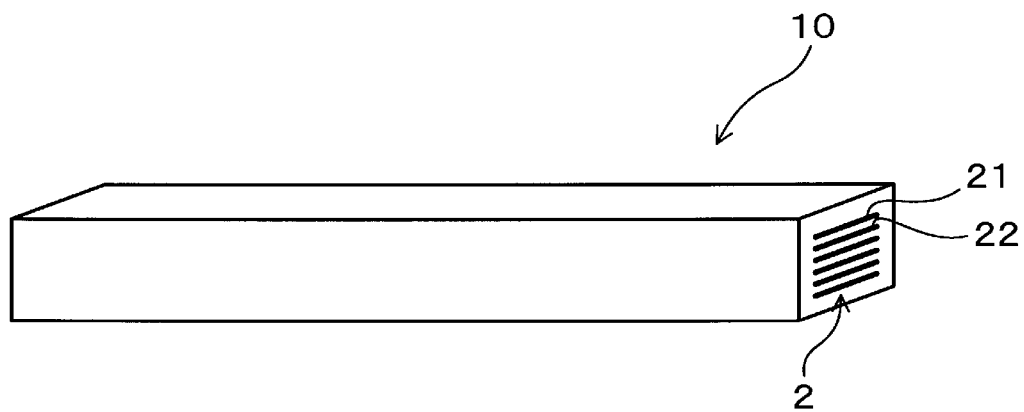
FIG. 5 is a perspective view showing a total configuration of another example of the sensor element of the particulate matter detection sensor in the first embodiment.

As illustrated in FIGS. 4 and 5, the sensor element 10 of the particulate matter detection sensor 1 may be configured such that the detection unit 2 having the pair of electrodes 21, 22 with the multi-layer structure is provided on a tip end surface of the insulating base 11. The sensor element 10 is, for example, formed in such a manner that a stack of alternately arranged electrode films which serves as the electrodes 21 and 22 is sintered, each electrode film being arranged between adjacent ones of the multiple insulating sheets of the insulating base 11 in the stack. In this case, end portions of the electrode films which serves as the electrodes 21 and 22 are alternately exposed at the tip end surface of the insulating base 11, thereby forming multiple electrode pairs of wire electrodes with different polarities. Each electrode film which serves as the electrode 21 and 22 is connected to a not-shown lead electrode, and these electrode films are connected together on a base-end side of the insulating base 11.

In the protection cover 12, the sensor element 10 having the detection unit 2 with the multi-layer structure is arranged such that the tip end surface on which the detection unit 2 is positioned is slightly on a base-end side with respect to the multiple measuring gas circulation holes 13 opening at the side surfaces of the protection cover 12. A configuration of the protection cover 12 is similar to that of the above-described example illustrated in FIG. 1. The measuring gas G flows into the protection cover 12 through the multiple measuring gas circulation holes 13 formed at the side surfaces, and then, the flow of gas toward the measuring gas circulation hole 14 formed at the tip end surface is formed. In this state, the measuring gas G does not directly flow from each measuring gas circulation hole 13 to the detection unit 2. The flows of measuring gas G introduced into the protection cover 12 join together in the vicinity of the tip end surface of the sensor element 10, and then, form the flow of gas toward the measuring gas circulation hole 14 formed at the tip end surface.

The sensor element 10 with the multi-layer structure also includes the not-shown heater unit 3. The heater electrode 31 and the lead electrodes 31a and 31b thereof may be embedded and formed in the insulating base 11, or may be printed and formed on the surface of the insulating base 11. Note that in the sensor element 10 with the multi-layer structure, the detection unit 2 is not necessarily formed on the tip end surface, and may be arranged on one side surface on the tip end side. In this case, a similar configuration is applied, in which an insulating film which serves as the electrode 21 and 22 is arranged between adjacent ones of the insulating sheets of the insulating base 11 and the thickness of the insulating sheet is a distance between the electrodes 21, 22.

The ECU 4 controls actuation of the detection unit 2 of the particulate matter detection sensor 1 and the heater unit 3, and controls the operation state of the internal combustion engine E. In FIG. 3, an exhaust gas temperature sensor 51 is attached and fixed to a wall of the exhaust gas path E1 in the vicinity of the particulate matter detection sensor 1, and therefore, can detect an exhaust gas temperature on the downstream side of the DPF 5. An air flow meter 52 is arranged in a suction air path E2 of the internal combustion engine E, and is configured to detect a suction air flow rate. Moreover, a rotation speed sensor 53 configured to detect the rotation speed of the internal combustion engine E, an accelerator pedal sensor 54 configured to detect operation of an accelerator pedal, and various other detection devices are provided. Detection signals from these various detection devices are input to the ECU 4.

The ECU 4 has a well-known configuration with a microcomputer 4A, and is connected to various detection devices via an input/output interface FF. The microcomputer 4A includes a CPU configured to perform arithmetic process, and a ROM and a RAM configured to store a program, data, etc. The microcomputer 4A periodically executes the program, thereby controlling each unit of the internal combustion engine E, including the particulate matter detection sensor 1. Depending on operation conditions of the internal combustion engine E, the SOF content of the particulate matter discharged to the exhaust gas path E1 changes. When the content of SOF with low conductivity increases, the resistance value of the particulate matter captured on the detection unit 2 changes. Thus, even for the same particle size and the same captured amount, a sensor output varies. For this reason, in the present embodiment, influence of the SOF contained in the particulate matter is eliminated. Further, temperature correction is performed to estimate the particle size of the particulate matter and calculate the number of particles.

The ECU 4 outputs the control signal to the particulate matter detection sensor 1 such that the particulate matter is accumulated on the detection unit 2 of the sensor element 10, and detects the captured particulate matter based on the signal from the sensor element 10. Specifically, as illustrated in FIG. 1, the ECU 4 includes a capture control unit 41 configured to form an electrostatic field by application of a predetermined voltage between the pair of electrodes 21, 22 of the detection unit 2 to electrostatically capture the particulate matter in the measuring gas G, a heating control unit 42 configured to supply power to the heater electrode 31 of the heater unit 3 to heat the detection unit 2 to a predetermined temperature, and a particle number calculation unit 43 configured to calculate the number N of particles of the captured particulate matter based on the sensor output V of the sensor element 10 and the average particle diameter D of the particulate matter.

The particulate matter detection sensor 1 traps, at the detection unit 2, the particulate matter between the pair of electrodes 21, 22, thereby detecting electric characteristics changeable depending on the amount of particulate matter. The distance between the pair of electrodes 21, 22 is, for example, set within a range of 5 to 500 μm. Typically, a smaller distance results in higher detection sensitivity. The heater unit 3 is capable of heating the detection unit 2 to a desired temperature to volatilize, e.g., the SOF contained in the captured particulate matter and burn and removed the soot. For example, a first temperature T1 at which the SOF can be volatilized is selected within a range of equal to or higher than 200° C. and equal to or lower than 400° C., and a second temperature T2 at which the soot can be burnt and removed is selected within a range of equal to or higher than 600° C. and equal to or lower than 1000° C.

While the temperature T of the sensor element 10 of the particulate matter detection sensor 1 is being monitored, the detection unit 2 is controlled to the desired temperature, and the amount of particulate matter is detected in a stepwise manner. In this manner, the influence of the SOF fluctuating depending on the operation state can be eliminated, and the number of particles of the particulate matter mainly containing the conductive soot can be detected with high accuracy. The temperature T of the sensor element 10 can be, for example, estimated using a correlation between a change in the heater resistance value of the heater unit 3 and the temperature of the heater electrode 31. Typically, a greater heater resistance value results in a greater amount of heat generated from the heater unit 3, and therefore, results in a higher temperature of the heater electrode 31. Thus, a not shown measurement circuit is, for example, interposed between the lead electrodes 31a and 31b to measure the heater resistance, and the temperature T of the sensor element 10 is measured using, for example, a map produced in advance. The map etc. can be stored in the ROM as a storage area of the ECU 4. Note that the temperature T of the sensor element 10 can be detected or estimated by an optional method, and a temperature sensor, for example, configured to detect a temperature in the vicinity of the detection unit 2 can be provided in combination with the particulate matter detection sensor 1.

Further, the particle number calculation unit 43 has an output changing ratio calculation unit 431 configured to heat the detection unit 2 by the heater unit 3 to acquire a first output value V1 as a sensor output at the first temperature T1 and a second output value V2 as the maximum sensor output upon heating to the second temperature T2, thereby calculating an output changing ratio V2/V1 as the ratio of the second output value V2 to the first output value V1. The output changing ratio calculation unit 431 has a temperature correction section configured to correct the calculated output changing ratio V2/V1. The temperature correction section corrects the output changing ratio V2/V1 based on the temperature T of the sensor element 10 at the second output value V2. Thus, influence of the temperature on the output changing ratio V2/V1 can be eliminated, and the particulate matter can be detected with higher accuracy.

The particulate matter detection device can be utilized for diagnosing failure of the DPF 5 arranged upstream of the particulate matter detection sensor 1. Typically, when the DPF 5 is normal, the discharged particulate matter is captured by the DPF 5, and almost no particulate matter is discharged to the downstream side of the DPF 5. In a case where particulate matter captured performance is lowered due to some kind of abnormality of the DPF 5, the number N of particles of the discharged particulate matter is measured at the particulate matter detection sensor 1 on the downstream side so that the presence or absence of the abnormality can be determined. In this case, the influence of the SOF contained in the particulate matter and variation in detection due to the influence of the temperature upon detection are reduced. In this manner, the detection accuracy of the particulate matter detection sensor 1 can be enhanced, and the abnormality can be promptly detected.

Figure 6:
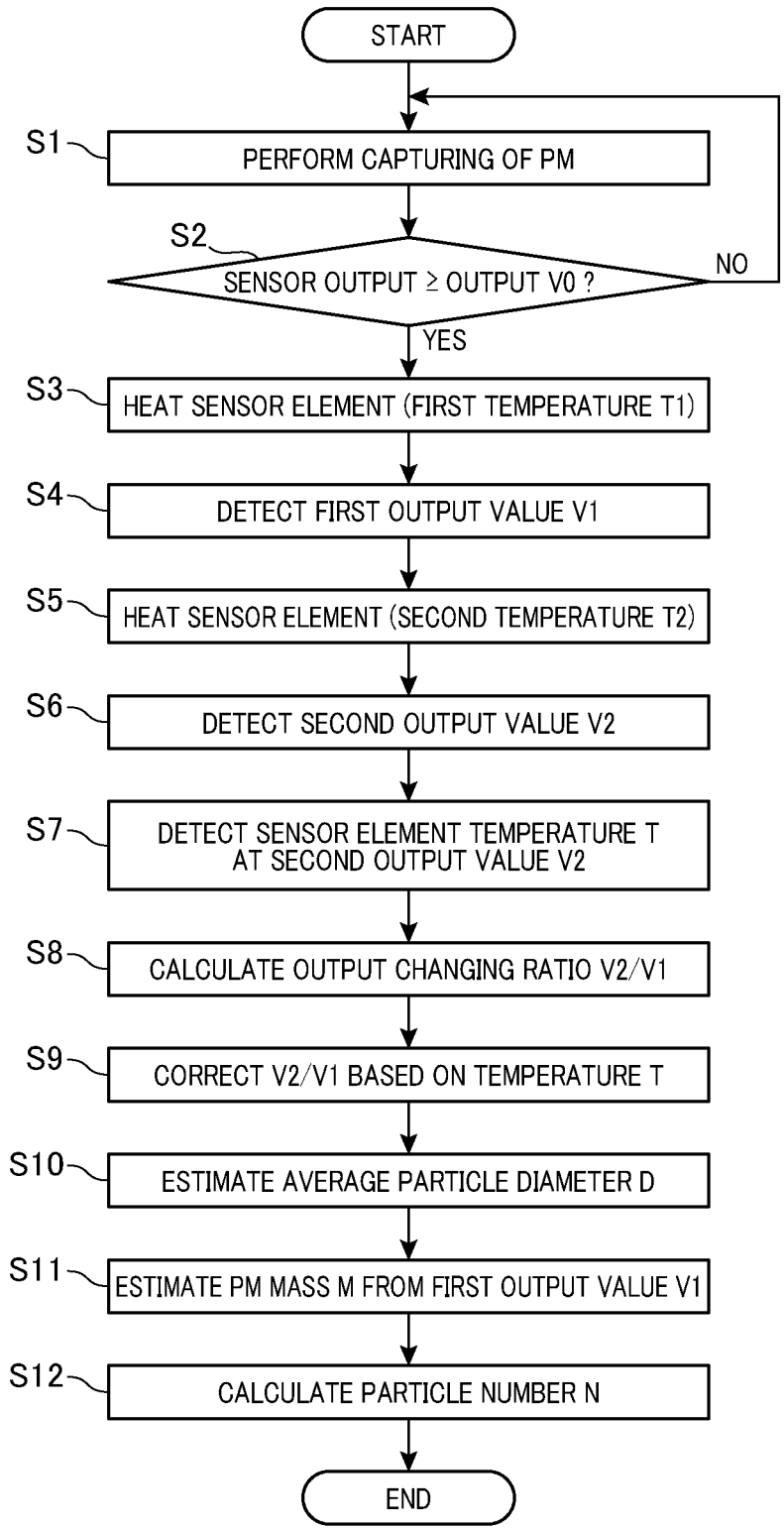
FIG. 6 is a flowchart of particulate matter detection process executed by a sensor control unit of the particulate matter detection device in the first embodiment.

Hereinafter, details of particulate matter detection process executed by the ECU 4 will be described with reference to a flowchart. As illustrated in FIG. 6, when the particulate matter detection process begins, at step S1, the particulate matter is captured onto the detection unit 2 of the particulate matter detection sensor 1. It is considered that when capturing of particulate matter begins, the particulate matter is burnt and removed in advance by later described heating process and no particulate matter is accumulated on the detection unit 2. The step S1 is a process of the capture control unit 41 of the ECU 4. The predetermined voltage set in advance is applied between the pair of electrodes 21, 22 of the sensor element 10, the particulate matter introduced into the protection cover 12 accumulates on the detection unit 2.

Figure 7:
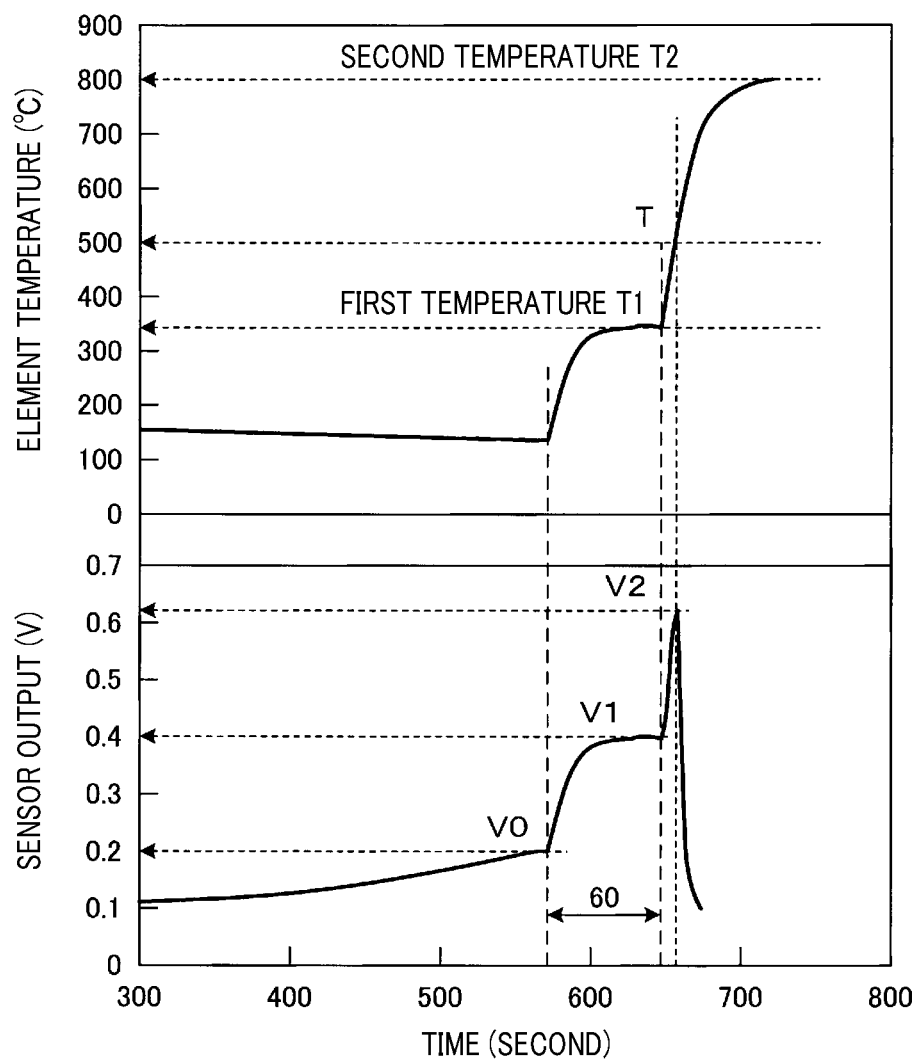
FIG. 7 is a graph showing a change in the temperature of the sensor element in relation to a time elapsed from the start of capturing particulate matter in the first embodiment.

Then, at a step S2, the sensor output V from the sensor element 10 is acquired for the determination of whether or not the sensor output V reaches a predetermined output V0. As illustrated in FIG. 7, the predetermined output V0 as a reference output is, for example, a reference output value set in advance corresponding to the amount of accumulated particulate matter as a threshold for diagnosing failure of the DPF 5 and taken as a reference for detection of the particulate matter. In a case where the sensor output V is lower than the predetermined output V0, it is determined as negative at step S2, and the process returns to step S1 to continue to electrostatically capture the particulate matter and detect the sensor output V.

When the sensor output V reaches the predetermined output V0 at step S2, such a state is taken as reaching the timing of calculating the number of particles of the particulate matter, and the process proceeds to a step S3. The number of particles of the particulate matter is calculated by subsequent process thereof. Steps S3 and S5 are a process of the heating control unit 42 of the ECU 4, and steps S4 and S6 to S12 are a process of the heating control unit 42 of the ECU 4.

Figure 8:
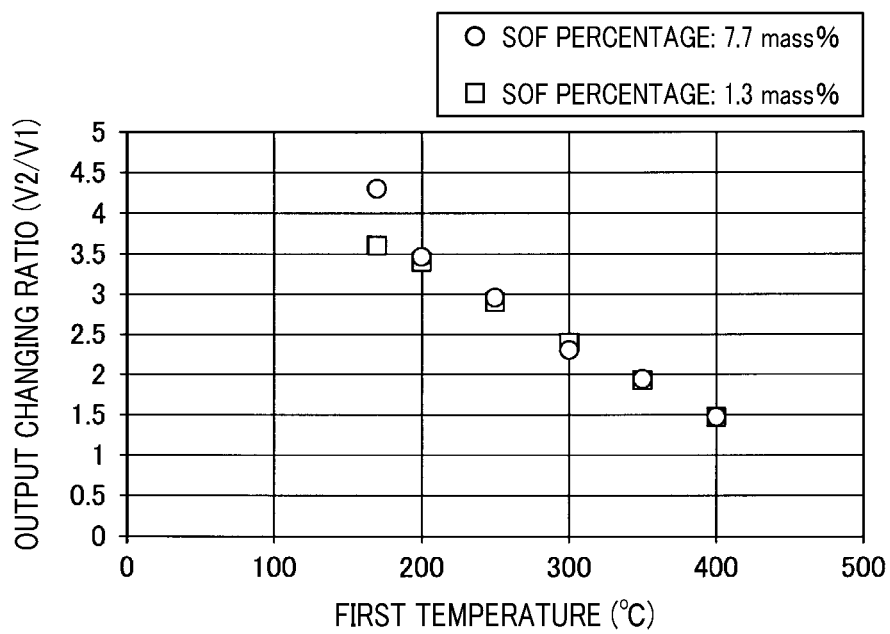
FIG. 8 comparatively shows a relationship between a first temperature and an output changing ratio when different percentages of soluble organic fractions are contained in the particulate matter, in a preferable first temperature range for heating the senor element, according to the first embodiment.

At step S3, the power is supplied to the heater unit 3 of the sensor element 10 to heat up the detection unit 2 to the first temperature T1 at which the SOF can be volatilized and no soot is burnt. As illustrated in FIG. 8, the first temperature T1 is a temperature at which the same output changing ratio V2/V1 is obtained regardless of a SOF percentage in the particulate matter, i.e., is selected within a range of equal to or higher than 200° C. and equal to or lower than 400° C. (e.g., 350° C.). At this step, the heating control unit 42 starts heating after a time point at which the sensor output V reaches the predetermined output V0, and controls the rate of temperature increase such that the temperature of the detection unit 2 converges to the preset first temperature T1. For example, the rate of the increasing temperature may be constant until the vicinity of the first temperature T1, and thereafter, may be gradually decreased such that the temperature of the detection unit 2 converges to the first temperature T1. Details of a relationship between the SOF percentage and the output changing ratio V2/V1 will be described later.

As illustrated in FIG. 7, while the temperature of the detection unit 2 is increasing due to actuation of the heater unit 3 and is converging to the first temperature T1, the sensor output V also shows a similar curve such that the sensor output V converges to the first output value V1 at the first temperature T1. This is because conductivity is improved with volatilization of the SOF due to an increase in the temperature increase. Thus, at step S3, a predetermined time period required for reaching the first temperature T1 is set in advance. After a lapse of the predetermined time, the process proceeds to step S4. The predetermined time is a time period necessary for to keep the detection unit 2 heated until the temperature of the detection unit 2 reaches the first temperature T1 and the SOF is sufficiently volatilized, and can be set as necessary (e.g., 60 seconds). At step S4, the first output value V1 at the first temperature T1 is acquired.

Then, the process proceeds to step S5, and the heater unit 3 further heats up the detection unit 2 to the second temperature T2. The second temperature T2 is a temperature at which the soot can be burnt and removed, i.e., is selected within a range of equal to or higher than 600° C. and equal to or lower than 1000° C. (e.g., 800° C.). When the second temperature T2 is lower than 600° C., there is a concern that the burning of the soot is insufficient. When the second temperature T2 exceeds 1000° C., heat resistance of the sensor element 10 is influenced.

As illustrated in FIG. 7, the temperature of the detection unit 2 increases from the first temperature T1. Similarly, the sensor output V also initially increases while the temperature of the detection unit 2 is converging to the second temperature T2. After a certain time point as a peak, the sensor output V decreases. This is because until the sensor output V reaches the second output value V2, which is the maximum output after the start of heating to the second temperature T2, the temperature is not a soot burning temperature. After the sensor output V has reached the second output value V2, the temperature is a soot burning temperature, thus, the sensor output V decreases until the soot is burnt and removed. In a period from the start of heating to the second temperature T2 to the second output value V2, the sensor output V further increases from the first output value V1. It is considered that the detection unit 2 is heated to the second temperature T2 which is higher than the first temperature T1, and accordingly, a crystal structure of the captured particulate matter changes, and as a result, crystalline characteristics of graphite exhibiting conductivity are improved.

Thus, at step S5, the temperature of the detection unit 2 is, after having reached the second temperature T2 from the first temperature T1, held for a predetermined time, and then, the process proceeds to step S6. The predetermined time is, for example, a time necessary for heating the detection unit 2 heated until the temperature increases to the second temperature T2 to burn and remove the particulate matter after the sensor output V has reached the second output value V2, and can be set as necessary. At step S6, the second output value V2 which is the maximum output until the temperature of the detection unit 2 increases to the second temperature T2 is acquired. Then, the process proceeds to step S7 to detect the temperature T of the sensor element 10 at the second output value V2. Further, at step S8, the output changing ratio V2/V1 is calculated from the first output value V1 and the second output value V2.

For particulate matters having the same average particle diameter (e.g., around 55 nm) but having different SOF percentages, when the first temperature T1 is changed, the same output changing ratio V2/V1 is obtained within a range of 200° C. to 400° C. regardless of the SOF percentage as illustrated in FIG. 8. That is, in the case of selecting the first temperature T1 within a range of 200° C. to 400° C., the SOF is sufficiently volatilized in the course of heating to the first temperature T1, and the first output value V1 without the influence of the SOF is obtained. Note that a point indicated by a white circle in FIG. 8 indicates a result under conditions that the engine rotation speed is 1654 rpm, a torque is 24 Nm, and the SOF percentage in the PM is 7.7 mass %. Moreover, a point indicated by a white square symbol indicates a result under conditions that the engine rotation speed is 2117 rpm, the torque is 83 Nm, and the SOF percentage is 1.3 mass %.

On the other hand, when the first temperature T1 is lower than 200° C., the output changing ratio (i.e., the result indicated by the white circle) in the case of a high SOF percentage is higher than the output changing ratio (i.e., the result indicated by the white square symbol) in the case of a low SOF percentage. It is considered that volatilization of the SOF is insufficient when the first temperature T1 is lower than 200° C., and therefore, the first output value V1 changes, and due to such this effect a higher SOF percentage results in a higher output changing ratio V2/V1. When the first temperature T1 exceeds 400° C., there is a concern that burning of the soot occurs.

The output changing ratio V2/V1 obtained as described above correlates with the average particle diameter D of the particulate matter. For the same average particle diameter, the same output changing ratio V2/V1 is obtained in a case where the same conditions are applied to the first temperature T1 and the second temperature T2. This is because a smaller particle size of the particulate matter results in an amorphous state with lower conductivity, and the crystal structure is changed into the graphite in the course of heating to the second temperature T2 to improve the conductivity. That is, tendency shows that a smaller average particle diameter D results in a lower sensor output V before heating. On the other hand, the sensor output V after heating shows the substantially same value regardless of the particle size, and therefore, the output changing ratio V2/V1 as the amount of change in the conductivity increases.

Figure 9:
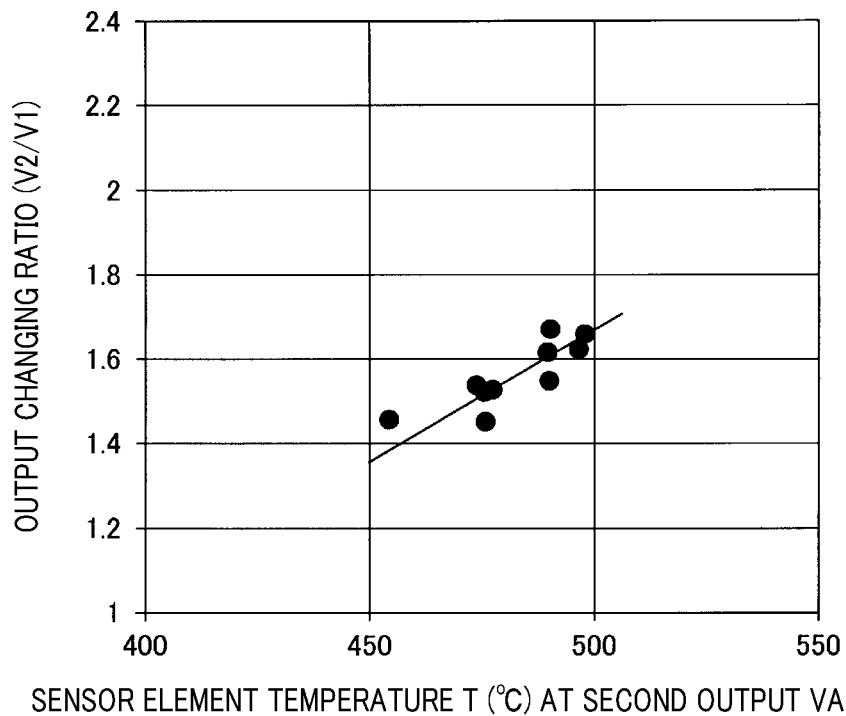
FIG. 9 is a graph showing a relationship between the temperature of the sensor element at a second output value and the output changing ratio in the first embodiment.

Thus, the average particle diameter D of the particulate matter can be estimated from the output changing ratio V2/V1, and can be used for calculation of the number N of particles. Note that it has been found that variation in the temperature T of the sensor element 10 at the second output value V2 and the output changing ratio V2/V1 occurs, in fact, even for the same operation conditions and the same measurement conditions as illustrated in FIG. 9. Note that FIG. 9 shows measurement results of the output changing ratio V2/V1 obtained by a repeated operation test using an engine bench under some identical operation conditions (i.e., the same average particle diameter). The operation conditions are that the engine rotation speed is 2117 rpm and the torque is 83 Nm, and the measurement conditions are that the first temperature T1 is 350° C. and the second temperature T2 is 800° C.

In FIG. 9, the temperature T of the sensor element 10 at the second output value V2 varies within a range of 450° C. to 500° C., and accordingly, a higher temperature T results in a higher output changing ratio V2/V1. This is considered to be due to a slight difference in the surrounding temperature of the sensor element 10 or a particulate matter accumulation state, is caused even under the same operation conditions of the internal combustion engine E, which in turn influences the start of burning of the soot, and also the conductivity of the soot which is influenced by the temperature, and the second output value V2 is varies according to the temperature at the start of burning. As a result, in FIG. 7, the temperature T of the sensor element 10 is not always constant at the start of burning of the soot while the temperature of the detection unit 2 is increasing from the first temperature T1 to the second temperature T2. This leads to variation in the second output value V2 as the maximum output and therefore variation in the output changing ratio V2/V1.

Using the relationship illustrated in FIG. 9, the output changing ratio V2/V1 is first corrected based on the temperature T of the sensor element 10 at step S9. Incidentally, step S9 is a process of the temperature correction section of the output changing ratio calculation unit 431. Specifically, the temperature T of the sensor element 10 at the second output value V2 and the output changing ratio V2/V1 are in a substantially positive correlation with each other as illustrated in FIG. 9. Thus, such a relationship can be checked in advance for each operation condition or measurement condition, and can be stored in the ROM of the microcomputer 4A. Thereafter, at step S10, the average particle diameter D of the particulate matter is estimated using the corrected output changing ratio V2/V1 so that the influence of the surrounding temperature of the sensor element 10 in detection of the particulate matter can be eliminated.

Figure 10:
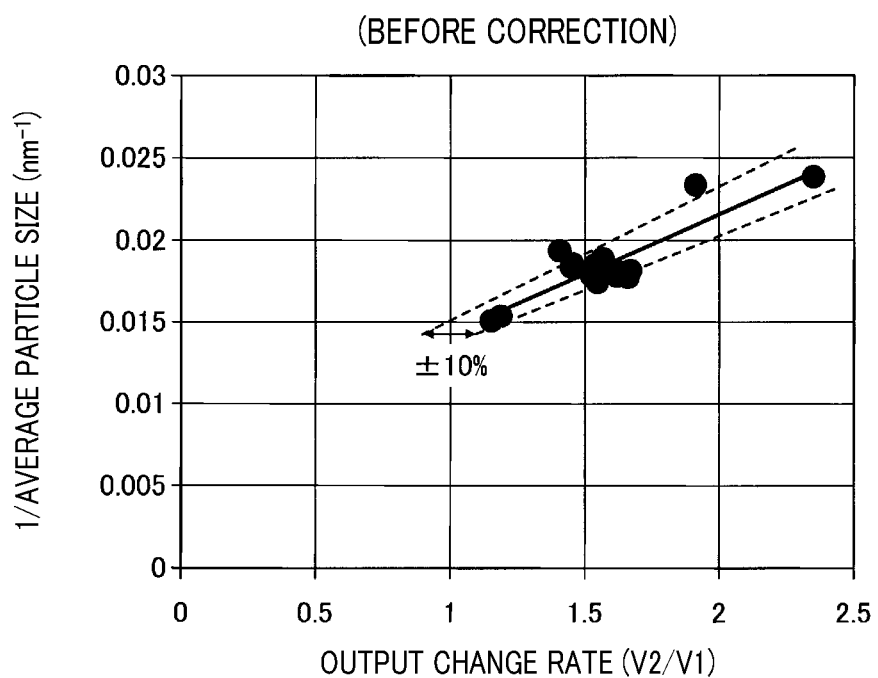
FIG. 10 is a graph showing a relationship between the output changing ratio before temperature correction and an average particle diameter in the first embodiment.

At step S10, the average particle diameter D of the particulate matter is estimated using the corrected output changing ratio V2/V1 and a relationship indicated by a solid line in FIG. 10. In FIG. 10, the vertical axis indicates the inverse of the average particle diameter D (i.e., a median size). An experiment result based on an engine exhaust particle sizer (EEPS) spectrometer is indicated by the solid line, and a range of ±10% from the solid line is indicated by dashed lines. As illustrated in the figure, the output changing ratio V2/V1 and the inverse of the average particle diameter D are in a substantially positive correlation with each other. Thus, such a relationship can be checked in advance for each operation condition or measurement condition, and can be stored in the ROM as the storage area of the ECU 4. The average particle diameter D obtained by this process is the average particle diameter of the particulate matter discharged to the downstream side of the DPF 5 in a capture period from the start of electrostatic capture at step S1 to the determination timing at step S2.

Figure 11:
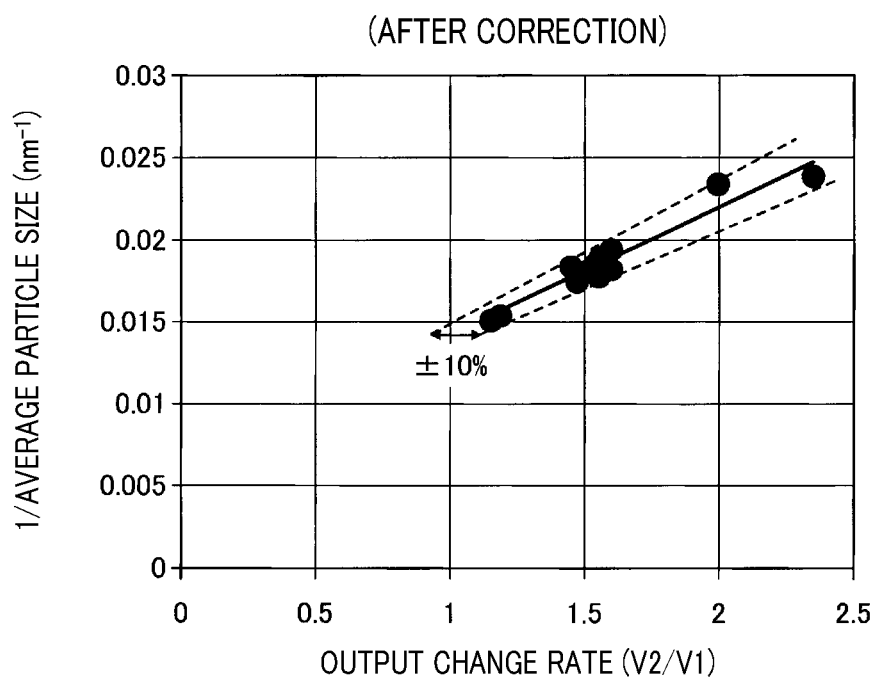
FIG. 11 is a graph showing a relationship between the output changing ratio after temperature correction and the average particle diameter in the first embodiment.

Points in FIGS. 10 and 11 indicate a relationship between the output changing ratio V2/V1 before correction at step S9 and an actual average particle diameter D for the output changing ratio V2/V1 after correction at step S9. Some of the multiple points in FIG. 10 show that the relationship between the actual average particle diameter D and the output changing ratio V2/V1 falls outside a range of ±10% from the solid line, whereas the multiple points in FIG. 11 show that almost all of the points fall within a range of ±10% from the solid line and the accuracy for estimating the average particle diameter is improved by correction.

Then, the process proceeds to step S11 to estimate the mass M of the particulate matter captured on the detection unit 2 of the sensor element 10 in the collection period based on the first output value V1. The first output value V1 is the sensor output V based on the particulate matter mainly containing the soot, and is in a positive correlation with the mass M of the particulate matter. Such a relationship is checked in advance, and is stored in the ROM as the storage area of the ECU 4. In this manner, the mass M can be estimated.

Further, the process proceeds to step S12 to calculate, using the estimated mass M of the particulate matter and the average particle diameter D, the number N of particles of the particulate matter according to the following expressions 1 and 2:

Expression 1: Particle Number N=Mass M/PM Average Volume×PM Specific density; Expression 2: PM Average Volume=$4\pi(D/2)^3/3$, where the specific density of the particulate matter (i.e., the PM specific density) is a preset value (i.e., 1 g/cm³), and the average volume of the particulate matter (i.e., the PM average volume) is, given that the particulate matter is in a spherical shape, calculated from the estimated average particle diameter D of the particulate matter according to the expression 2.

Second Embodiment

In the first embodiment, the case where the mass M of the particulate matter is estimated based on the first output value V1 has been described, but other values than the first output value V1 can be used.

Figure 12:
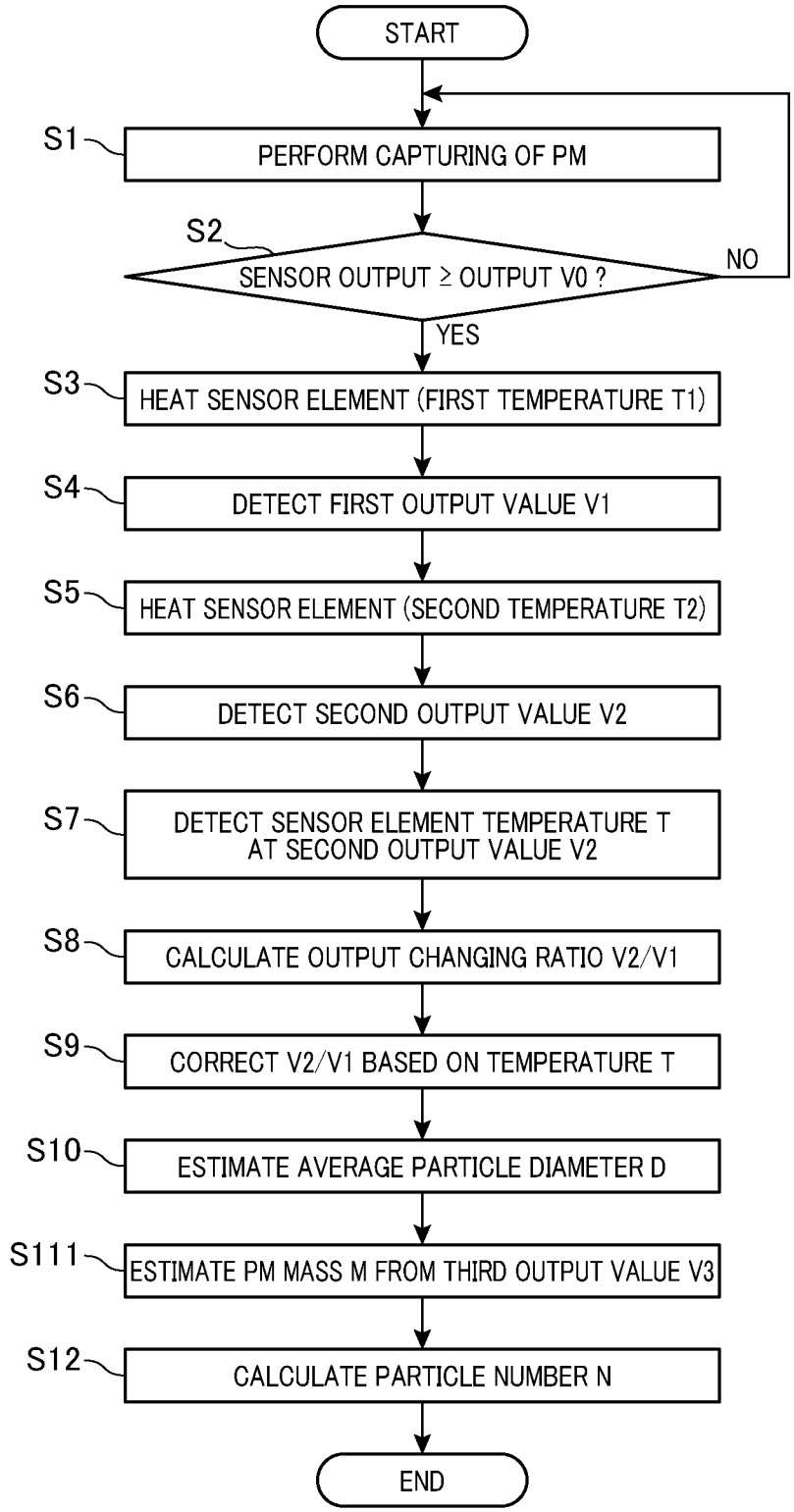
FIG. 12 is a flowchart showing the particulate matter detection process executed by a sensor control unit of a particulate matter detection device in a second embodiment.

As illustrated in FIG. 12, in the present embodiment, particulate matter detection process executed by an ECU 4 as a sensor control unit is configured such that part of the procedure of the first embodiment illustrated in FIG. 6 is changed. Specifically, this process is different in that a step S111 is provided instead of step S11 of FIG. 6. Steps S1 to S10 are the same process as that of FIG. 6, and therefore, description thereof will be omitted. At step S111 of FIG. 12, the mass M of a particulate matter is estimated using a sensor output V at the time of positive determination at step S2 instead of a first output value V1 at a first temperature T1.

At step S2 of FIG. 12, it is determined whether or not the sensor output V reaches a predetermined output V0 set in advance. A third output value V3 as a sensor output at the time of positive determination is in a substantially positive correlation with the mass M of the particulate matter captured on a detection unit 2 of a sensor element 10 in a collection period. Such a relationship may be obtained in advance, and may be stored in a ROM as a storage area of an ECU 4. In this manner, the mass M may be estimated. Note that the third output value V3 is an output based on the particulate matter before a SOF is removed, but SOF influence in estimation of the mass is small. Alternatively, operation conditions may be taken into consideration upon estimation of the mass.

Then, at a step S12, the number N of particles of the particulate matter can be, as in the first embodiment, calculated using the mass M of the particulate matter calculated at step S111 and an average particle diameter D.

Note that unless otherwise provided, the same reference numerals as those of the already described embodiment represent, in the second embodiment and subsequent embodiments, components etc. similar to those of the already described embodiment.

Third Embodiment

In the first and second embodiments, the case where temperature correction is performed after calculation of the output changing ratio V2/V1 has been described, but the necessity of temperature correction can be eliminated by temperature increase control. That is, in the present embodiment, a heating control unit 42 has a temperature increase control section configured to control the rate of temperature increase upon heating from a first temperature T1 to a second temperature T2. The heating control unit 42 constantly controls the rate of temperature increase until the temperature T of a sensor element 10 at least exceeds a temperature corresponding to a second output value V2. By the temperature increase control section, the temperature T of the sensor element 10 at which burning of soot begins can be stabilized, and variation in an output changing ratio V2/V1 can be reduced.

Figure 13:
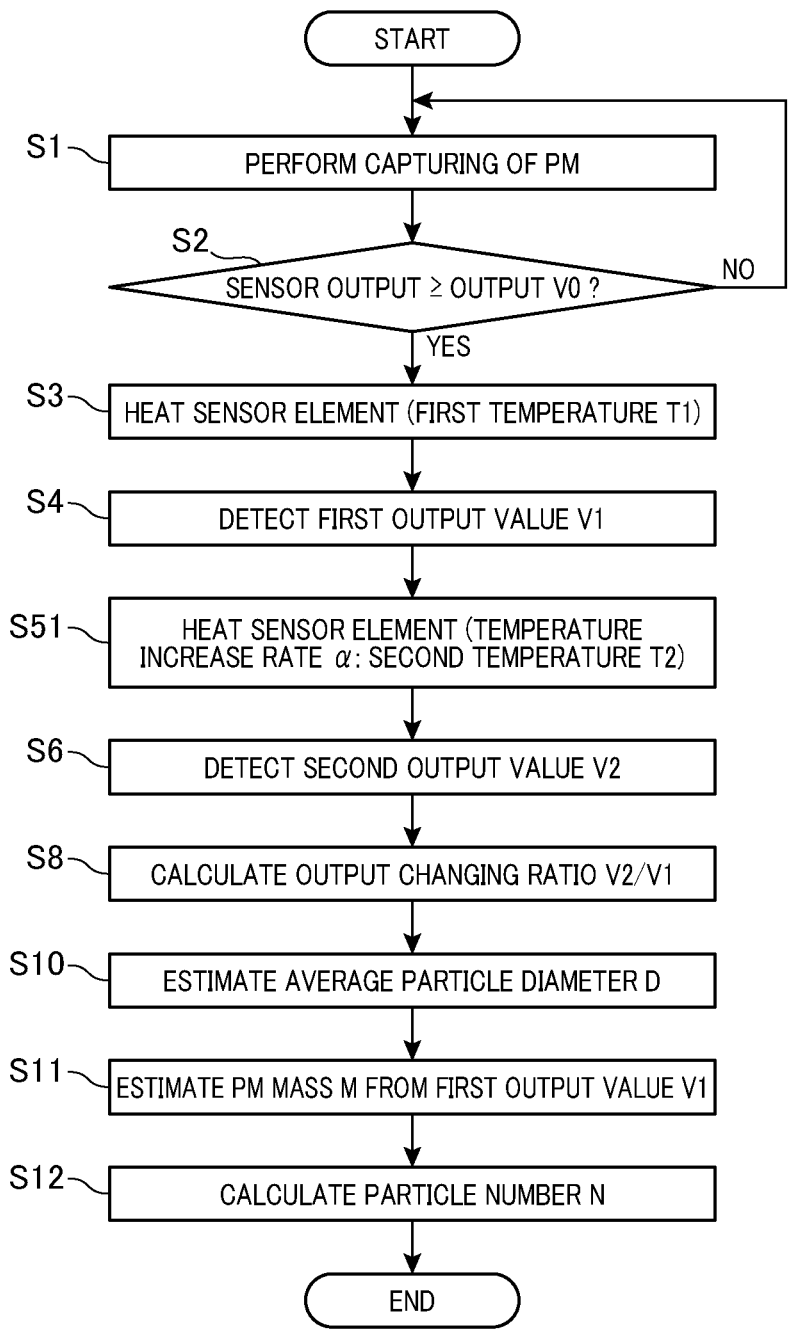
FIG. 13 is a flowchart showing a particulate matter detection process executed by a sensor control unit of a particulate matter detection device in a third embodiment.

As illustrated in FIG. 13, in the present embodiment, particulate matter detection process executed by an ECU 4 as a sensor control unit is configured such that part of the procedure of the first embodiment illustrated in FIG. 6 is changed. Specifically, this process is different in that a step S51 is provided instead of step S5 of FIG. 6 and that temperature retrieving of step S7 and temperature correction of step S9 are not performed. Steps S1 to S4 are the same process as that of FIG. 6, and therefore, description thereof will be omitted.

At step S51 of FIG. 13, the sensor element 10 is heated while the temperature increase control is being performed using the heating control unit 42. Step S51 is process as the temperature increase section. Specifically, a constant temperature increase rate α is set in advance, and control to the constant temperature increase rate α is made from the first temperature T1 to the vicinity of the second temperature T2 as illustrated in FIG. 7. Thereafter, the rate of temperature increase is gradually decreased, and the element temperature converges to the second temperature T2. As described above, when heating is further performed with the element temperature being held at the first temperature T1, crystalline characteristics of a particulate matter are improved, and a sensor output increases. When the element temperature reaches a temperature at which burning of the particulate matter begins, the sensor output decreases from the second output value V2 as a peak.

Figure 14:
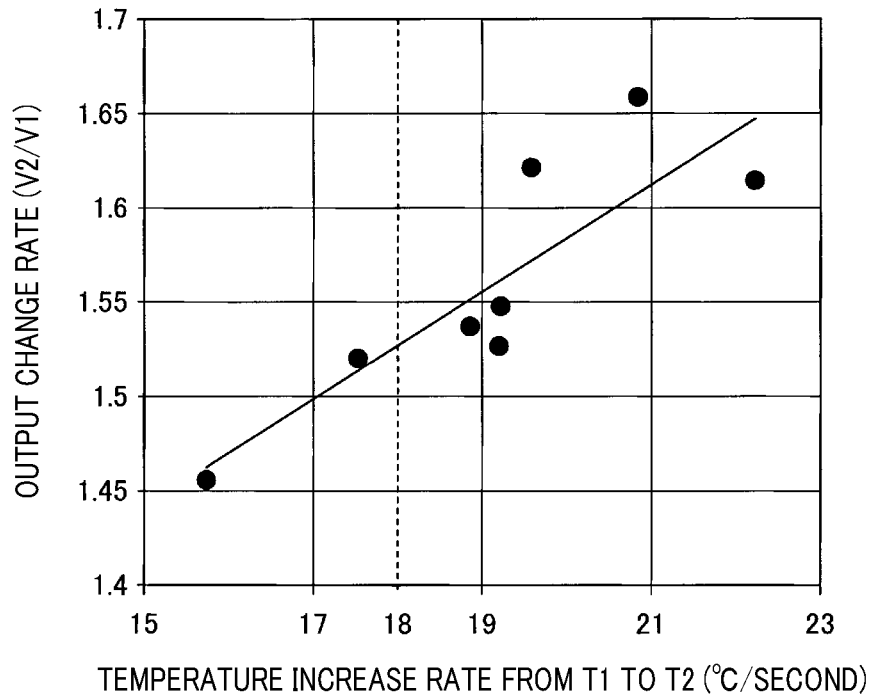
FIG. 14 is a graph showing a relationship between a temperature increase rate from a first temperature to a second temperature and an output changing ratio in the third embodiment.

In this case, for the same average particle diameter of the particulate matter, the same temperature T corresponding to the second output value V2, and the same output changing ratio V2/V1 are expected to be obtained. However, in fact, variation in the temperature T occurs as illustrated in FIG. 9. On this point, it has been found that when heating is performed from the first temperature T1 to the second temperature T2, the output changing ratio V2/V1 changes according to the rate of temperature increase as illustrated in FIG. 14. Note that FIG. 14 shows measurement results of the output changing ratio V2/V1 by an operation test using an engine bench under conditions similar to those of FIG. 9, and shows a relationship with the rate of temperature increase (e.g., 15° C./second to 23° C./second) when a temperature increase from the first temperature T1 to the second temperature T2 begins.

Figure 15:
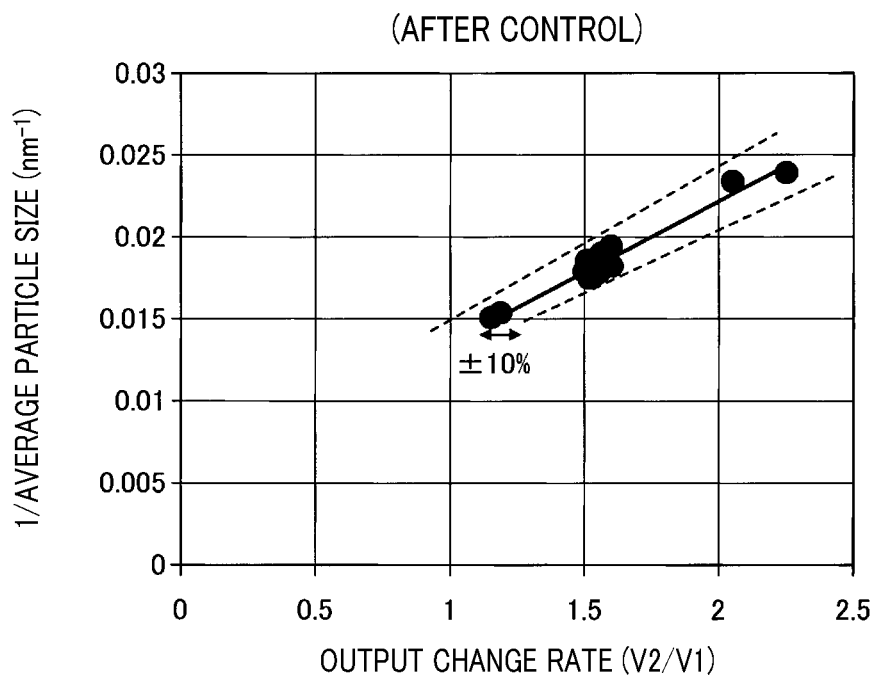
FIG. 15 is a graph showing a relationship between the output changing ratio after temperature increase control and an average particle diameter in the third embodiment.

FIG. 14 shows tendency that a higher rate of temperature increase results in a higher output changing ratio V2/V1. Thus, a relationship with an average particle diameter D is obtained for each rate of temperature increase based on FIG. 14 so that the average particle diameter D of the particulate matter can be estimated. For example, when a temperature rising from the first temperature T1 to the second temperature T2 is controlled at 18° C., as shown with the dashed line in FIG. 14, the relation between the output changing ratio V2/V1 and inverse of the average particle diameter D (specifically the median size) is shown in FIG. 15. That is, in the case of performing the control of the rate of temperature increase, all points indicating an actual relationship with the average particle diameter D fall within a range of ±10% from a solid line. On the other hand, in the case of not performing the control of the rate of temperature increase, variation similar to that illustrated in FIG. 10 occurs. As described above, it is confirmed that variation in the temperature at which burning of the soot begins is reduced by the control of the rate of temperature increase and the temperature T in FIG. 7 is stabilized.

The relationship illustrated in FIG. 15 can be checked in advance for each rate of temperature increase, and can be stored in a ROM as a storage area of the ECU 4. At step S51, a temperature increase is made at the constant temperature increase rate α until the element temperature sufficiently exceeds the temperature at which burning of the soot begins. Thereafter, the element temperature is increased to the second temperature T2, and then, is held for a predetermined time. Then, the process proceeds to a step S6 to acquire the second output value V2 as the maximum output until the element temperature increases to the second temperature T2. Then, at a step S8, the output changing ratio V2/V1 is calculated from a first output value V1 and the second output value V2.

In the present embodiment, step S7 illustrated in FIG. 6, i.e., detection of the temperature T of the sensor element 10 at the second output value V2, and temperature correction 7 of step S9 based on the temperature T are omitted. That is, at step 51, control of the preset constant temperature increase rate α is performed, and therefore, a stable temperature increase is available based on known temperature increase characteristics. Thus, variation in the temperature at which burning of the soot begins is reduced, and the temperature T leading to the second output value V2 is substantially constant. Thus, the output changing ratio V2/V1 obtained at step S8 is the substantially same result as that in the case of performing temperature correction. With this configuration, the average particle diameter D can be, at a step 10, estimated from a map corresponding to the output changing ratio V2/V1 obtained at step S8 and the temperature increase rate α.

Thereafter, the mass M of the particulate matter is calculated from the first output value V1 at a step S11. Then, at a step S12, the number N of particles of the particulate matter can be, as in the first embodiment, calculated using the average particle diameter D and the mass M of the particulate matter calculated at steps S10, S11.

Figure 16:
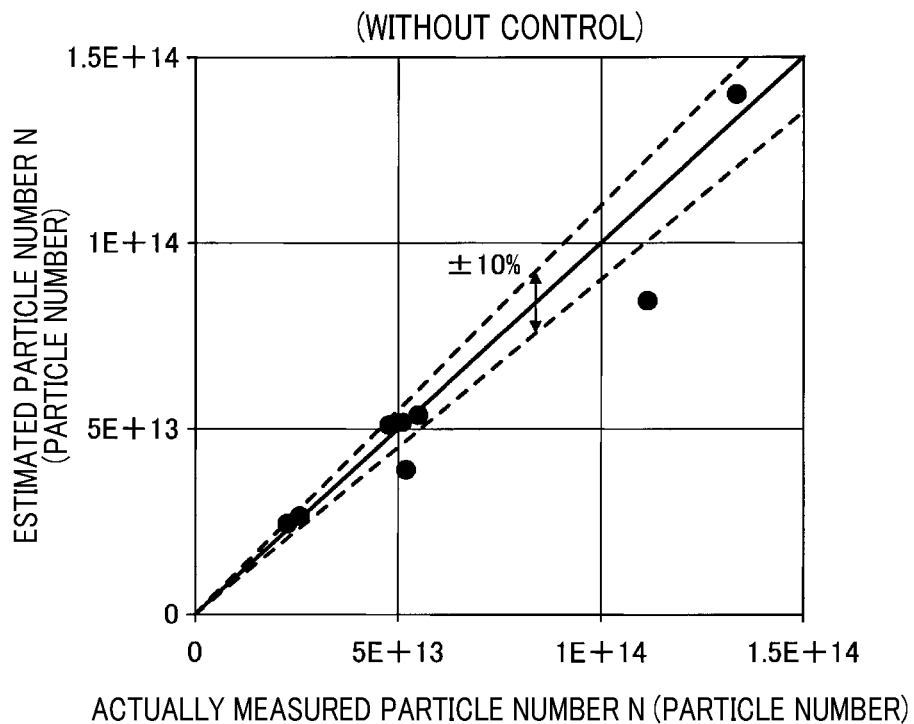
FIG. 16 is a graph showing a relationship between number of particles actually measured and an estimated number of particles in the absence of the temperature increase control in the third embodiment.
Figure 17:
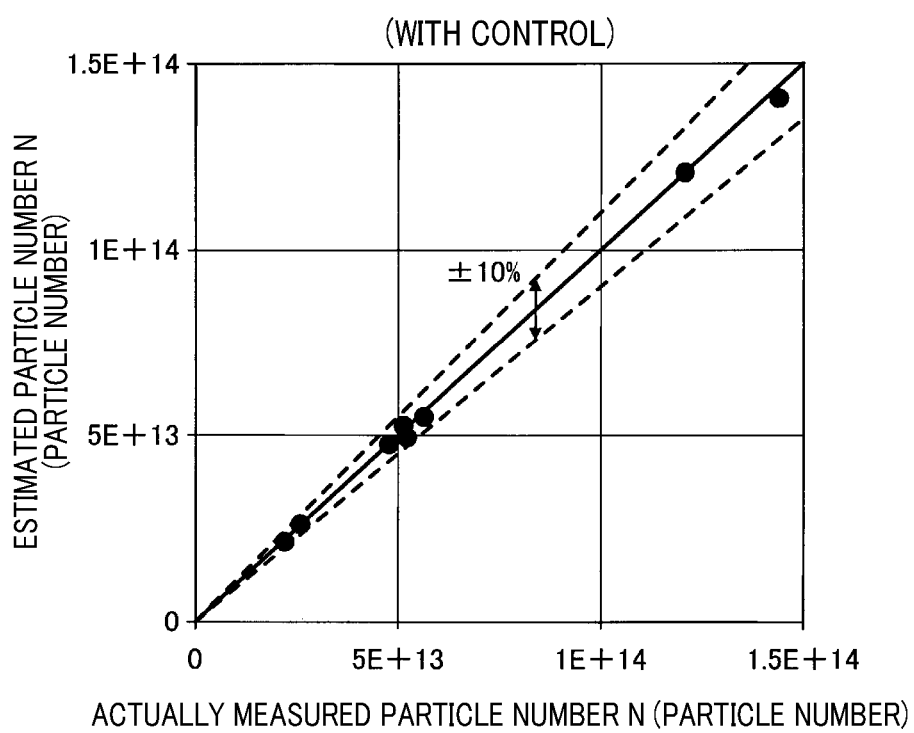
FIG. 17 is a graph showing the relationship between the number of particles actually measured and the estimated number of particles in the case of the presence of the temperature increase control in the third embodiment.

FIGS. 16 and 17 show a relationship between the estimated particle number N as the calculated value of step S12 and the actually-measured number of particles in each of the case of not performing the control of the temperature increase rate at step 51 and the case of performing the control of the temperature increase rate. As indicated by dashed lines in FIG. 16, in the case of the absence of the control of the temperature increase rate, some points indicating the relationship between the estimated particle number N and the actually-measured number of particles fall outside a range of ±10% from a solid line. On the other hand, as indicated by dashed lines in FIG. 17, in the case of the presence of the control of the temperature increase rate, all points indicating the relationship between the estimated particle number N and the actually-measured number of particles fall within a range of ±10% from a solid line.

Fourth Embodiment

In the third embodiment, the mass M of the particulate matter can be, as in the second embodiment, estimated based on other values than the first output value V1.

In a fourth embodiment illustrated in FIG. 18, particulate matter detection process executed by an ECU 4 as a sensor control unit is configured such that part of the procedure of the third embodiment illustrated in FIG. 13 is changed. Specifically, this process is different in that a step S111 is provided instead of step S11 of FIG. 13. Steps S1 to S6, S8, and S10 are the same process as that of FIG. 13, and therefore, description thereof will be omitted.

At step S111 of FIG. 18, the mass M of a particulate matter is estimated using a sensor output V at the time of positive determination at step S2 instead of a first output value V1 at a first temperature T1. At step S2 of FIG. 18, it is determined whether or not the sensor output V reaches a predetermined output V0 set in advance, and a third output value V3 as a sensor output V at the time of positive determination is used. As described above, the third output value V3 has a substantially positive correlation with the mass M of the particulate matter captured on a detection unit 2 of a sensor element 10 in a collection period. Such a relationship can be checked in advance, and can be stored in a ROM as a storage area of the ECU 4.

Then, at a step S12, the number N of particles of the particulate matter can be, as in the third embodiment, calculated using the mass M of the particulate matter calculated at step S111 and an average particle diameter D.

As described above in each embodiment, the voltage is applied to the detection unit 2 of the particulate matter detection sensor 1 to collect the particulate matter. In addition, the heater unit 3 is used to control heating to the first temperature T1 and the second temperature T2. At this point, the sensor output V is monitored so that the number of particles of the particulate matter can be detected with high accuracy. Moreover, the particulate matter detection device is utilized for, e.g., an exhaust purification device of an internal combustion engine so that failure of the DPF 5 arranged on the upstream side can be diagnosed.

The particulate matter detection device of the present disclosure including the particulate matter detection sensor 1 and the ECU 4 is not limited to the above described embodiments, and various changes can be made without departing from the gist of the present disclosure. For example, in the first embodiment, the protection cover 12 covering the sensor element 10 of the particulate matter detection sensor 1 has a single tubular structure, but may have a double tubular structure including an inner tube and an outer tube. Arrangement of the measuring gas circulation holes 13, 14 provided at the protection cover 12 and the number of measuring gas circulation holes 13, 14 can be set as necessary. In addition, the shape, material, etc. of each unit forming the particulate matter detection sensor 1, such as the sensor element 10 and the protection cover 12, can be changed as necessary.

In the first embodiment, the internal combustion engine E is the diesel engine, and the DPF 5 as the particulate matter collection unit is arranged. However, the internal combustion engine E may be a gasoline-powered engine, and a gasoline particulate filter may be arranged. Moreover, the measuring gas is not limited to the combustion exhaust gas of the internal combustion engine E. As long as the measuring gas contains the particulate matter, the present disclosure is applicable to any type of gas.

What is claimed is:

1. A particulate matter detection device for detecting a particulate matter contained in measuring gas, comprising:
a sensor unit having a detection unit provided with a pair of electrodes separated from each other is arranged on a surface of an insulating base exposed to the measuring gas and a heater unit provided with a heater electrode configured to heat the detection unit and which is configured to output a signal corresponding to an amount of particulate matter captured on the detection unit; and
a sensor control unit configured to
set a first temperature at which a soluble organic fraction (SOF) in the particulate matter is volatilizable and soot is not burnable, and perform a first control for the heater unit to heat the detection unit at the first temperature for a predetermined of time;

detect, as a first output value, a voltage from the sensor unit when completing heating of the detection unit at the first temperature for the predetermined of time;

set a second temperature at which at which the soot is burnable, and perform a second control, after the first control, to heat the detection unit at the second temperature for another predetermined period of time;

detect, as a second output value, a voltage from the sensor unit when completing heating of the detection unit at the second temperature for the another predetermined of time;

detect the temperature of the sensor unit at the second output value;

calculate an output changing ratio defined as a ratio of the second output value to the first output value;

correct the output changing ratio based on the detected temperature of the sensor unit at the second output value;

estimate an average particle diameter of the particulate matter from the corrected output changing ratio and a mass of the particulate matter estimated from output of the sensor unit; and calculate a number of particles of the particulate matter based on the average particle diameter and the mass of the particulate matter.

2. A particulate matter detection device for detecting a particulate matter contained in measuring gas, comprising:

a sensor unit which has a detection unit configured such that a pair of electrodes separated from each other is arranged on a surface of an insulating base exposed to the measuring gas and a heater unit provided with a heater electrode configured to heat the detection unit and which is configured to output a signal corresponding to an amount of particulate matter captured on the detection unit; and a sensor control unit configured to detect the number of particles of the captured particulate matter based on a sensor output from the sensor unit, wherein the sensor control unit comprises a capture control unit configured to apply voltage between the pair of electrodes of the detection unit to electrostatically capture the particulate matter, a heating control unit configured to supply power to the heater electrode of the heater unit to heat the detection unit to a first temperature at which a SOF in the particulate matter is volatilizable and soot is not burnable and hold the detection unit at the first temperature or to heat the detection unit to a second temperature at which the soot is burnable and maintain the detection unit at the second temperature, an output changing ratio calculation unit configured to acquire a first output value as a sensor output at the first temperature and a second output value as a maximum sensor output upon heating from the first temperature to the second temperature, thereby calculating an output changing ratio as a ratio of the second output value to the first output value, and a particle number calculation unit configured to calculate the number of particles by means of an average particle diameter of the particulate matter estimated from the calculated output changing ratio and a mass of the particulate matter estimated from the sensor output, and the heating control unit has a temperature increase control section configured to control a temperature increase rate when heating the sensor unit from the first temperature to the second temperature.

3. The particulate matter detection device according to claim 2, wherein the heating control unit constantly controls the temperature increase rate of the sensor unit until a temperature of the sensor unit at least exceeds a temperature corresponding to the second output value.

4. The particulate matter detection device according to claim 1, wherein the sensor control unit determines whether or not the sensor output reaches a reference output as a reference for detection of the particulate matter, and actuates the heating control unit.

5. The particulate matter detection device according to claim 1, wherein the sensor control unit calculates the mass of the particulate matter by using the first output value.

6. The particulate matter detection device according to claim 4, wherein the sensor control unit calculates the mass of the particulate matter by means of a third output value as a sensor output, at time of reaching the reference output.

7. The particulate matter detection device according to claim 4, wherein the heating control unit starts heating after the sensor output has reached the reference output, and controls the temperature increase rate such that a temperature of the detection unit converges to the preset first temperature.

8. The particulate matter detection device according to claim 1, wherein the sensor control unit estimates the average particle diameter such that a higher output changing ratio the smaller average particle diameter.

9. The particulate matter detection device according to claim 1, wherein the sensor control unit calculates the number of particles from the mass of the particulate matter, the average particle diameter of the particulate matter, and a specific density of the particulate matter.

10. The particulate matter detection device according to claim 9, wherein the specific density of the particulate matter is 1 g/cm$^3$.

11. The particulate matter detection device according to claim 1, wherein the first temperature is a temperature which is equal to or higher than 200° C. and equal to or lower than 400° C.

12. The particulate matter detection device according to claim 1, wherein the second temperature is a temperature which is equal to or higher than 600° C. and equal to or lower than 1000° C.

13. The particulate matter detection device according to claim 2, wherein the sensor control unit determines whether or not the sensor output reaches a reference output as a reference for detection of the particulate matter, and actuates the heating control unit.

14. The particulate matter detection device according to claim 3, wherein the sensor control unit determines whether or not the sensor output reaches a reference output as a reference for detection of the particulate matter, and actuates the heating control unit.

15. The particulate matter detection device according to claim 2 wherein the sensor control unit calculates the mass of the particulate matter by using the first output value.

16. The particulate matter detection device according to claim 5, wherein the heating control unit starts heating after the sensor output has reached the reference output, and controls the temperature increase rate of the sensor unit such that a temperature of the sensor control unit converges to the preset first temperature.

17. The particulate matter detection device according to claim 1, wherein the sensor control unit estimates the average particle diameter such that a higher output changing ratio the smaller average particle diameter.

18. The particulate matter detection device according to claim 2, wherein the sensor control unit calculates the number of particles from the mass of the particulate matter, the average particle diameter of the particulate matter, and a specific density of the particulate matter.

19. The particulate matter detection device according to claim 2, wherein the first temperature is a temperature which is equal to or higher than 200° C. and equal to or lower than 400° C.

20. The particulate matter detection device according to claim 2, wherein the second temperature is a temperature which is equal to or higher than 600° C. and equal to or lower than 1000° C.

* * * * *